(12) United States Patent
Tung (10) Patent No.: US 6,747,238 B1
(45) Date of Patent: Jun. 8, 2004

(54) APPARATUS FOR ELECTRODISCHARGE MACHINING

(75) Inventor: Chin-Juei Tung, Yun-Kan (TW)

(73) Assignee: Yihawjet Enterprises Co., Ltd., Tainan (TW)

(*) Notice: Subject to any disclaimer, the term of this patent is extended or adjusted under 35 U.S.C. 154(b) by 3 days.

(21) Appl. No.: 10/356,197

(22) Filed: Jan. 30, 2003

(51) Int. Cl.[7] .............................. B23H 1/00; B23H 7/30
(52) U.S. Cl. .................................................. 219/69.2
(58) Field of Search .............................. 219/69.2, 69.11

(56) References Cited

U.S. PATENT DOCUMENTS

| | | | |
|---|---|---|---|
| 6,353,199 B1 | * | 3/2002 | Hosaka et al. ............ 219/69.11 |
| 6,459,063 B1 | * | 10/2002 | Okazaki et al. ............ 219/69.2 |
| 6,538,227 B1 | * | 3/2003 | Sano et al. ................ 219/69.2 |
| 6,627,838 B2 | * | 9/2003 | Kato et al. ................ 219/69.2 |

* cited by examiner

Primary Examiner—Geoffrey S. Evans
(74) Attorney, Agent, or Firm—Pro-Techtor International Services (57) ABSTRACT

An apparatus for electrode charge machining includes a T-shaped quill movable in the vertical direction, at least two linear motor yokes attached to the quill symmetrical about the fixed point of the piston rod of a counter balance device and moving in parallel, at least two linear motor permanent magnets facing the yokes, an electrode mounting device fixed at the lower end of the quill, the counter balance device for balancing a gravitational force acting on the quill and the tool electrode. The gravity balance device consists of an air cylinder with the piston rod. And the air cylinder is fixed with a support frame, with the piston rod extending down into the quill and fixed with a level plate in the quill in the coaxially with the quill.

7 Claims, 12 Drawing Sheets

APPARATUS FOR ELECTRODISCHARGE MACHINING

BACKGROUND OF THE INVENTION

This invention relates to an apparatus for electrodischarge machining to form holes of desired shapes in a workpiece, by moving a tool electrode vertically down to make a very small gap between the workpiece and the tool electrode and causing repeated electric discharge of over 60V for a long period of time between the workpiece and the tool electrode.

Electrodischarge machining is widely applied to a conductive workpiece, especially for manufacturing molds and sophisticated components. A workpiece to be processed is fixed on a table, and a tool electrode is made of conductive materials such as copper or graphite, and cut into a needed shape and then is held movable in a vertical direction by a quill above the table. Then the tool electrode is moved very close to the workpiece, separated by a very small gap of 10–100 μm. Then if power pulse of over 60V and 1 A is applied between the electrode and the workpiece during the ON time, dielectric liquid of insulation flowing in the gap breaks down and electric discharge (or called electric avalanche) occurs. The electric discharge is a process of energy transmission and energy distribution, producing a very high heat shock to give rise to vaporizing and melting so that the insulation fluid vaporizes and inflates. After electric discharge comes to an end, sudden cooling occurs to let inflated air press inward to form microscopic crater-shaped cavities remained in the surface of the workpiece. The surface roughness of the cavities depends on the pulse-on time and peak current of the power used in the machining process. The quill has to be adjusted in its position for removing debris out of the workpiece, and the gap between the electrode and the workpiece has to be kept proper for continuing the process. Besides, the debris and air bubbles have to be exhausted out at the same time during machining in order to maintain safety.

Flushing operation during the discharging process is effected by the flowing of dielectric fluid caused by pressure difference in the gap between the electrode and a workpiece being machined. There are three kinds methods for removing waste debris:

1. A suckling mouth or nozzle is placed through the electrode or a workpiece, needing the cost for the added component and its route. But it is not easy to obtain balanced smoothness.
2. Flushing oil on the sidewall of the workpiece cavity: this is easy to perform, but pressure of the flushed oil may be not enough to remove the debris in a deep hole, causing secondary discharge in the deep cavity, greatly affecting the precision and surface uniformity of a workpiece.
3. Utilizing a jump motion operation of the electrode: if a low moving speed is used in this method, the electrode may only jump for a short distance, and its speed is very slow, less than 3 m/min, so working time has to be prolonged, wasting much time in waiting, and too frequent jumping may spend too much time to obviously lower efficiency.

It is preferable to use only the third method for improving accuracy of the shape of the cavity in a workpiece, because it can easily acquire balanced flushing pressure. As to accuracy and speed, it is important to design a high-speed movement method and mechanism.

SUMMARY OF THE INVENTION

An object of the invention is to provide an electric discharge machining apparatus that can effectively performing vertical movement to a horizontal level, and at the same time to provide a weight balancing device and a positioning device so as to alleviate the whole structure, rigidifying and exposing the structure. Then the apparatus becomes profitable in accommodating, adjusting, completely eliminating necessity of taking apart the device in maintaining and operating.

The invention includes a T-shaped quill movable in the vertical direction to move a tool electrode toward a workpiece while repeatedly producing electric discharge between the workpiece and the tool electrode. The T-shaped quill consists of a square column and a rectangular cubic member provided with two rectangular through holes coaxial with the quill and a T-shaped through hole coaxial with the quill, and the square column has a hole communicating with the T-shaped hole. The invention further includes an electrode mounting device fixed under the square column for fixing a tool electrode, and a gravitation force balancing device for balancing the quill and the electrode mounting device consists of an air cylinder fixed on a support frame moving in parallel to the quill. The air cylinder has a piston rod extending down in the T-shaped through hole and fixed with a level fix plate in the square column. The invention further includes at least two linear motors, which respectively have a yoke fixed in the rectangular through holes of the cubic member and located symmetrical about the balance device and the connect point of the level fix plate in the square column.

BRIEF DESCRIPTION OF DRAWINGS

This invention will be better understood by referring to the accompanying drawings, wherein.

DETAILED DESCRIPTION OF THE PREFERRED EMBODIMENTS

Figure 1:
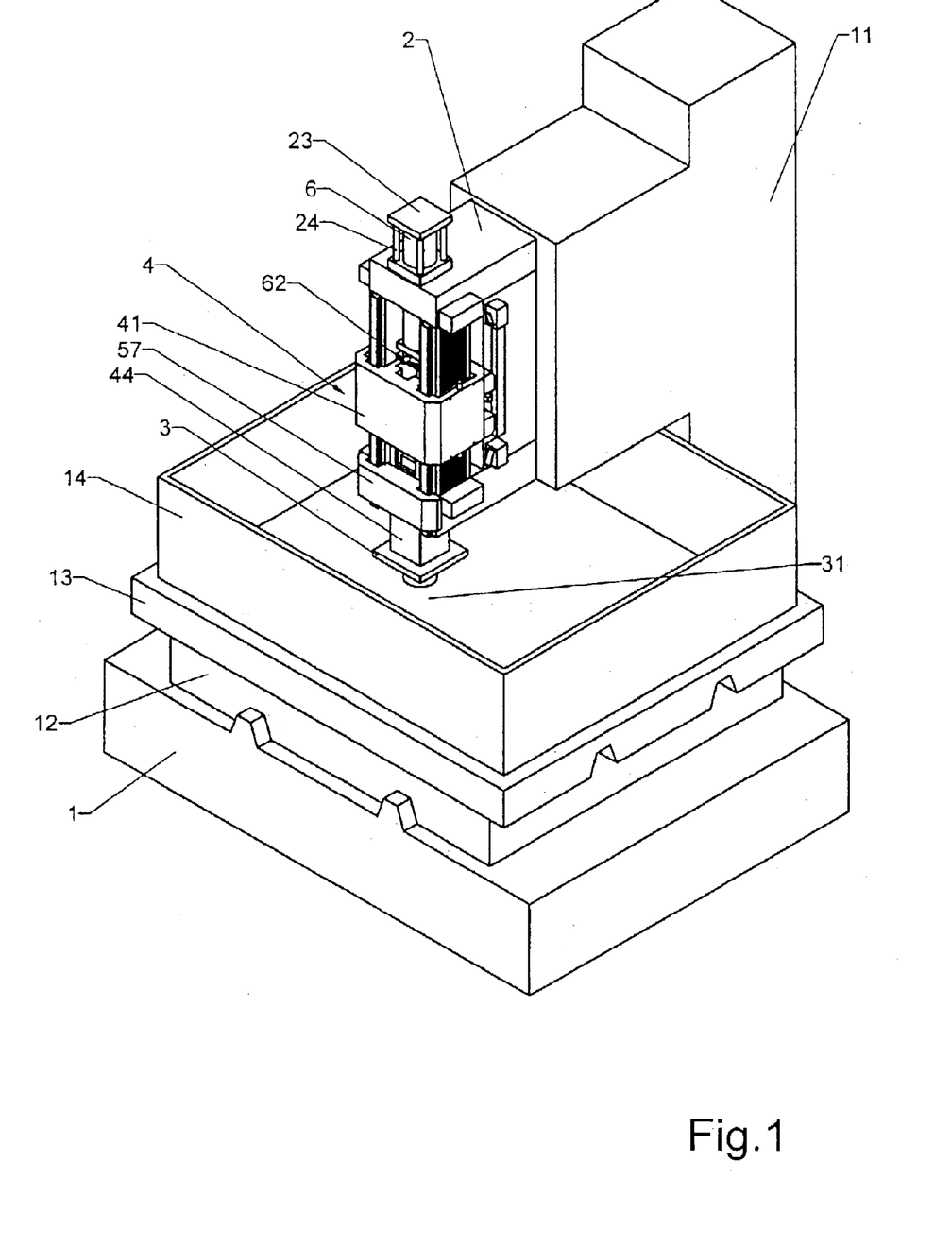
FIG. 1 is a perspective view of a first embodiment of an apparatus for elect rod is charge machining in the present invention.
Figure 2:
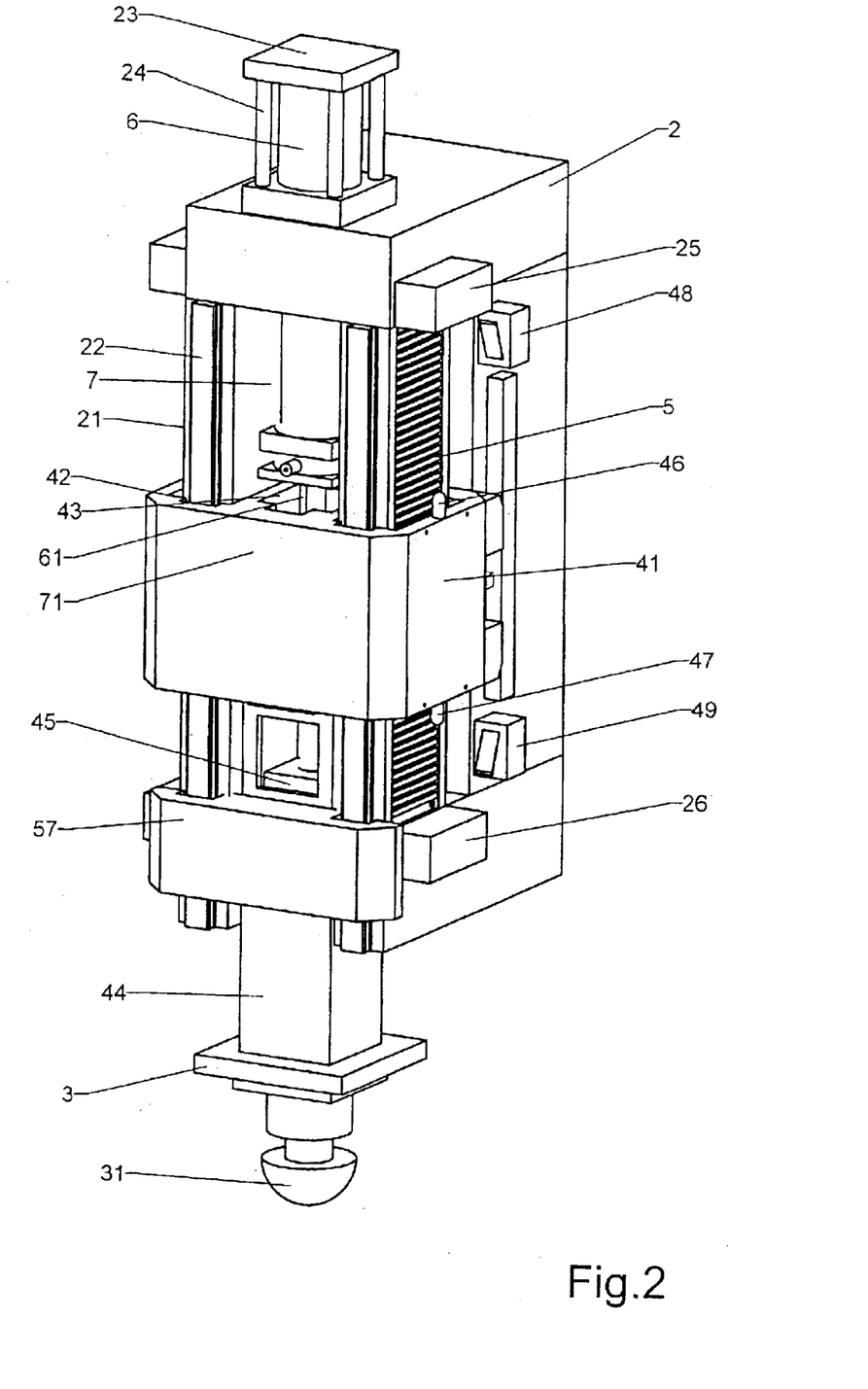
FIG. 2 is another perspective view of the first embodiment of an apparatus for electrodischarge machining in the present invention'
Figure 3:
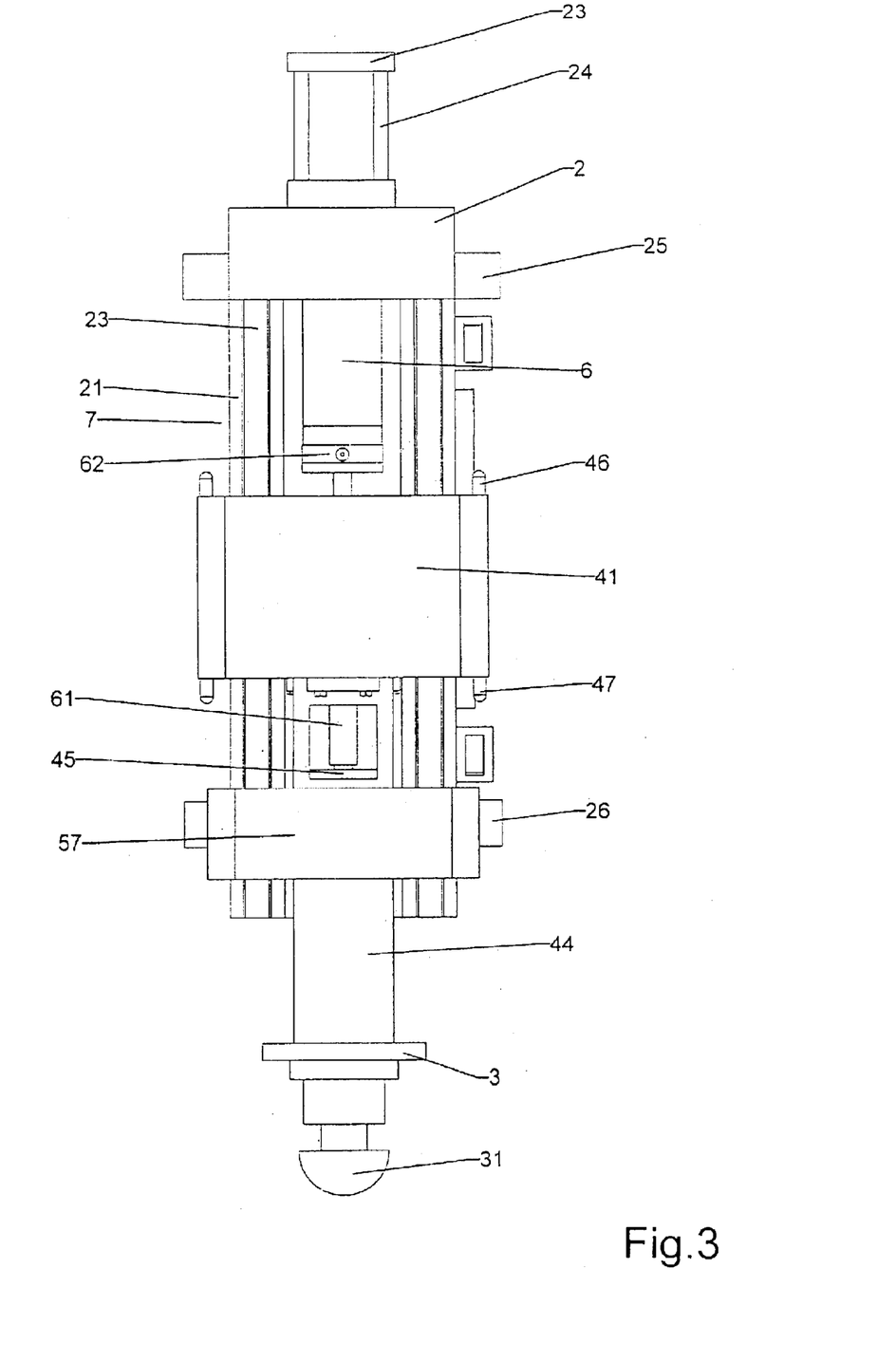
FIG. 3 is a front view of the first embodiment of an apparatus for electrodischarge machining in the present invention.

A first embodiment of an apparatus for electrodischarge machining in the present invention, as shown in FIGS. 1, 2 and 3, includes a column 11 fixed with a rear side of a bed 1, a frame 2 positioned at a front side of the column 11, a T-shaped quill 4 disposed in the frame 2, a slidable member 12 sliding in the Y axis direction, a saddle 13 positioned on the slidable member 12 and moving in the X axis direction vertical to the Y axis direction, a workpiece hole 14 formed in the saddle 13 and filled with insulation liquid, a tool electrode 31 connected to an electrode mounting device 3 connected coaxially to a lower straight portion of the T-shaped quill 4.

Figure 4:
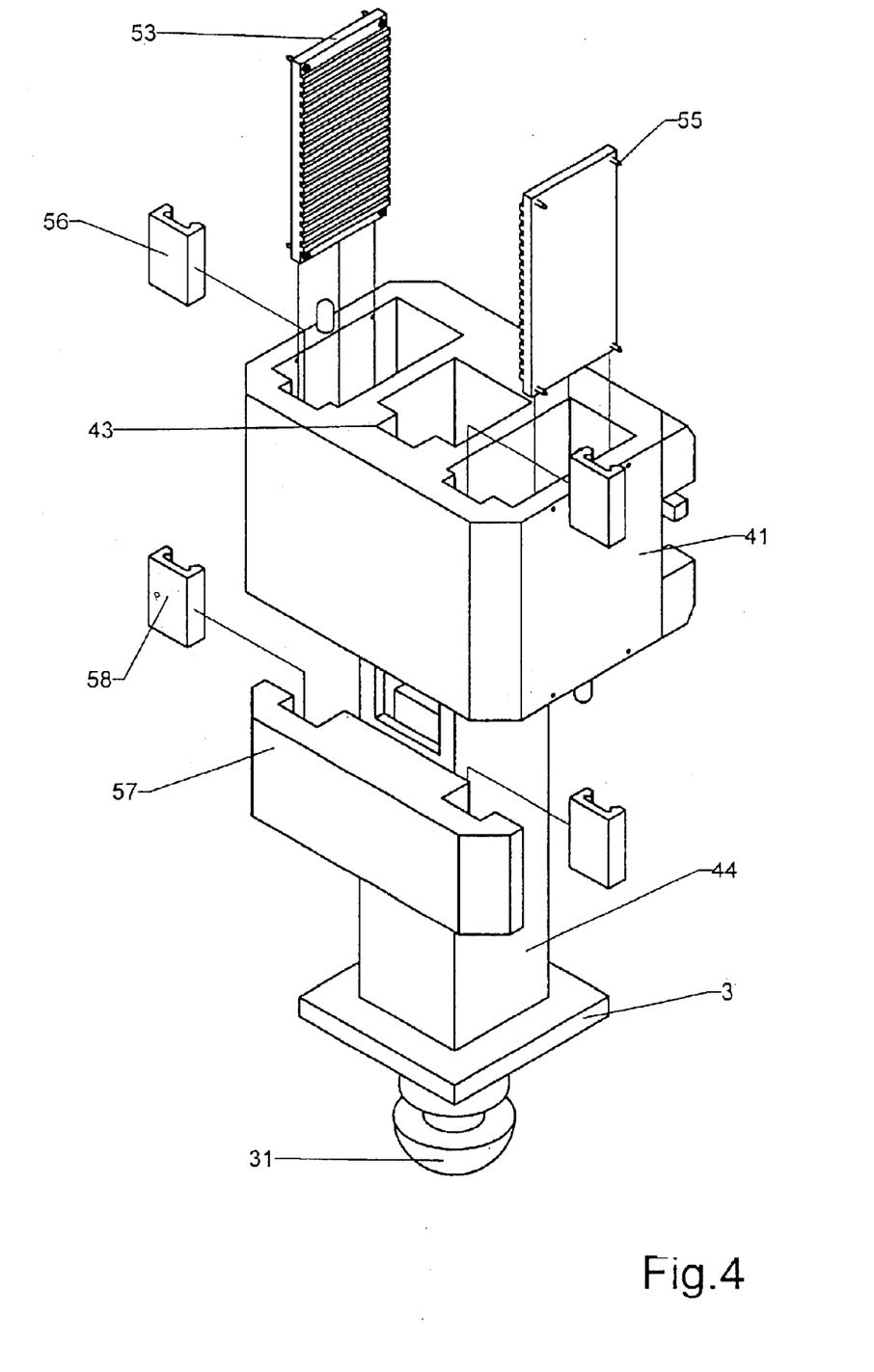
FIG. 4 is a perspective view of a T-shaped quill in the present invention.

The T-shaped quill 4 shown in FIG. 4 has a rectangular cubic member 41 formed in the upper portion, and the rectangular cube member 41 has an upper and a lower surface in parallel, two rectangular holes 42 and a T-shaped hole 43 positioned between the two holes 42, and all the three holes 42, and 43 are vertical in the same axis.

The frame 2 has two straight rectangular posts 21 respectively in a front left side and a front right side and respectively passing through the two rectangular holes 42 so that the T-shaped quill 4 may move up and down with the acceleration more than 10 m/s in the Z axis direction with the holes 42 moving along the two posts 21. This force is supplied by two linear motors 5.

Figure 5:
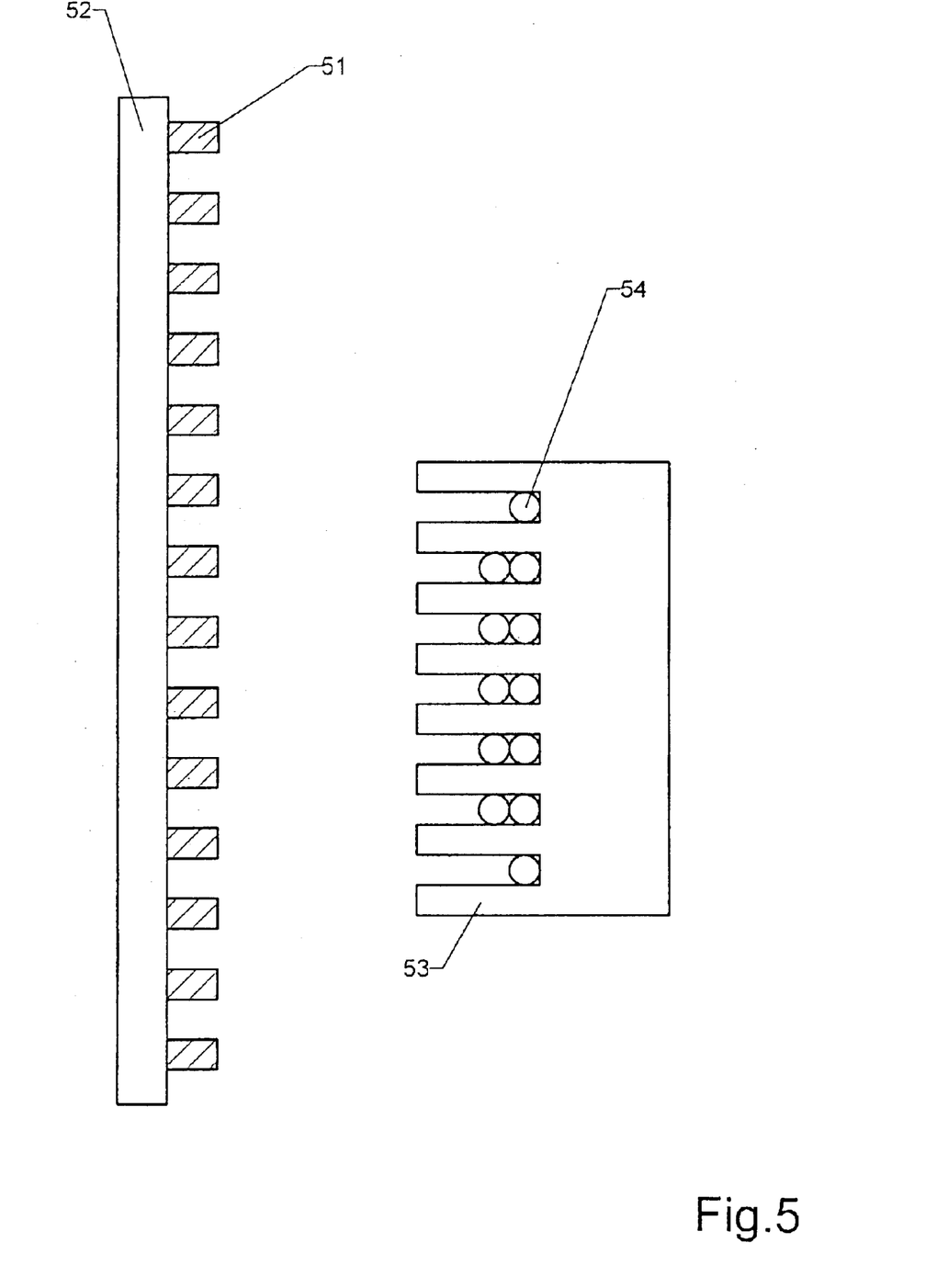
FIG. 5 is a side view of a linear motor in the present invention.

Next, as shown in FIG. 5, each linear motor S has a stator consisting of a plurality of permanent magnets 51 and a magnetic plate 52 with the permanent magnets 51 fixed spaced apart thereon, positioned vertical at an outer side of each rectangular parallel post 21, and an armature coil 54 and a yoke 53 of each motor 5 are positioned vertically to face in parallel the permanent magnets 51 and the magnetic plate 52, fixed firmly in the two rectangular holes 42 of the rectangular cubic member 41.

As the level cross-sectional surface of the rectangular cube member 41 has four circumferential walls of different thickness, so rigorously speaking, the T-shaped quill 4 has no true geometrical center axis, and at the same time the gravitational axis of the T-shaped quill 4 is eccentric to the geometrical axis of the rectangular cube member 41 or the square column 44.

Further, the upper and the lower surface of the rectangular holes 42 of the rectangular cubic member 41 respectively have a blocker 46, 47 to limit the largest stroke of the rectangular cubic member 41. When the blockers 46 and 47 respectively collide with the stoppers 25, 26 of the frame 2, they function as elastic components of shock force. Further, limiters 48 and 49 are provided at an upper side and a lower side of the sidewall of the frame 2 behind the stoppers 25, 26, restricting the rising position of the rectangular cubic member 41, as shown in FIGS. 1, 2, 3 and 7.

The magnetic plate 52 and the armature coil 54 of the linear motor 5 face each other with a gap extremely tiny and accurate, and possible to be adjusted in their positions by adjusting screws 55, enabling the two linear motors 5 provided with a same function. Because the linear motors 5 have a direct load of the T-shaped quill 4 and the tool electrode 31 and a high speed for moving them, the motors 5 produce extremely large driving force, generally involving much heat at the same time so that a circulating cooling system has to be used for exhausting the heat produced by a machine shaft, guaranteeing precise positioning of the machine axis. The circulating cooling system is commonly applied to industrial products, by providing an inlet (not shown in the Figures) of an air or liquid cooling tube at the edge of the yoke 53 near the armature coil 54 of the linear motors 5. Further, a linear optical scale 7 as shown in FIG. 2 is fixed on one side of the frame 2, and a position sensor 71 is fixed at one side of the rectangular cubic member 41 for facing the linear optical scale 7 in order to read the moving position of the T-shaped quill 4.

Figure 6:
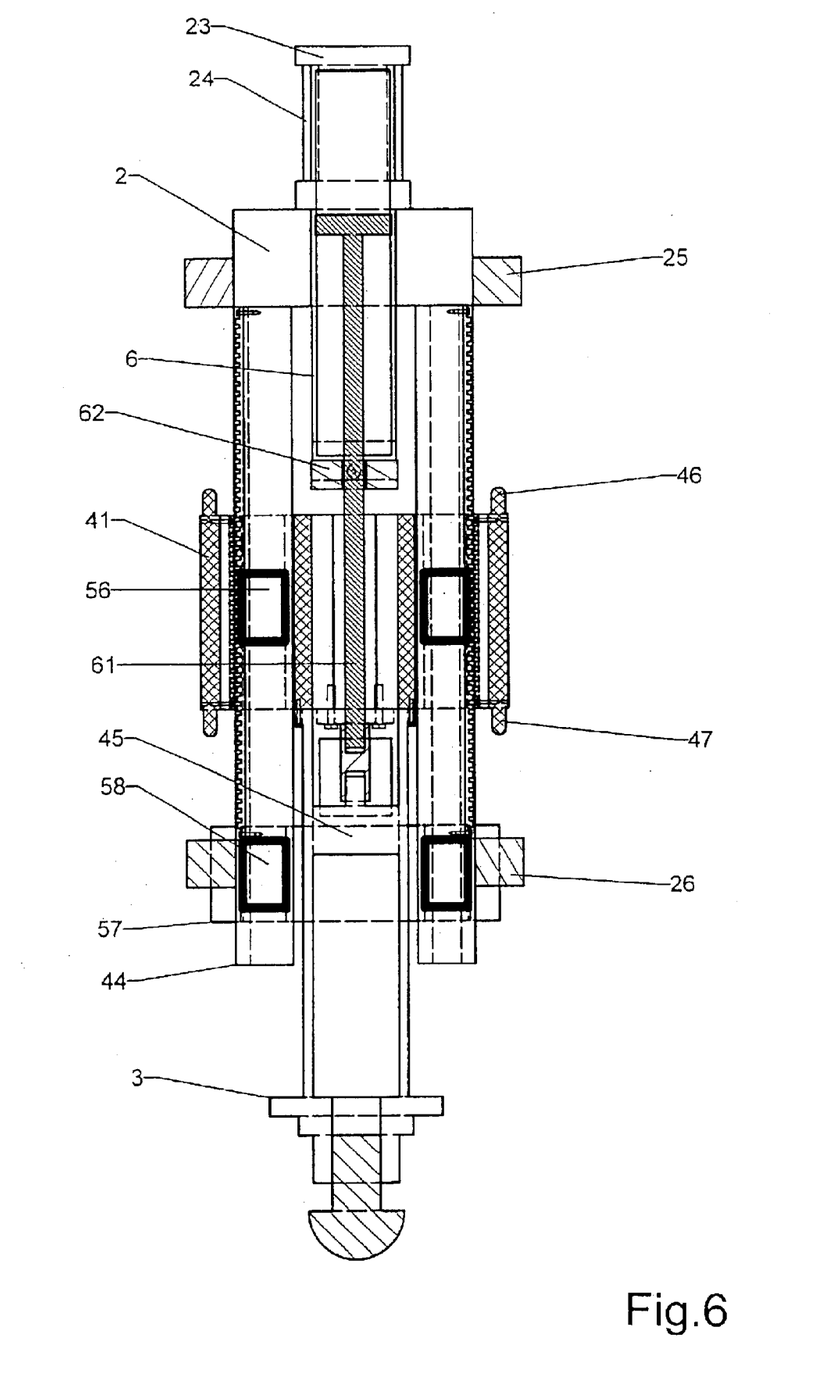
FIG. 6 is a front cross-sectional view of the first embodiment of an apparatus for electrodischarge machining in the present invention.

Next, at least two linear roller bearing rails 22 are provided in order to accurately guide the T-shaped quill 4 in its operation, as shown in FIGS. 4 and 6, respectively fixed at a front side of the two rectangular posts 21 of the frame 2 in the same axis of movement, and with two parallel upper bearing blocks 56 fixed in the two rectangular holes 42 of the cubic member 41 (or on the front inner wall of the two rectangular holes 42), matching closely with the linear roller bearing rails 22. Further, a fixing plate 57 is fixed at an intermediate portion of the T-shaped quill 4, and two lower bearing slideable blocks 58 are fitted in two recesses in an inner sidewall of the fixing plate 57 to match with the linear roller bearing rails 22, for strengthening bending stiffness of the square column 44.

Figure 7:
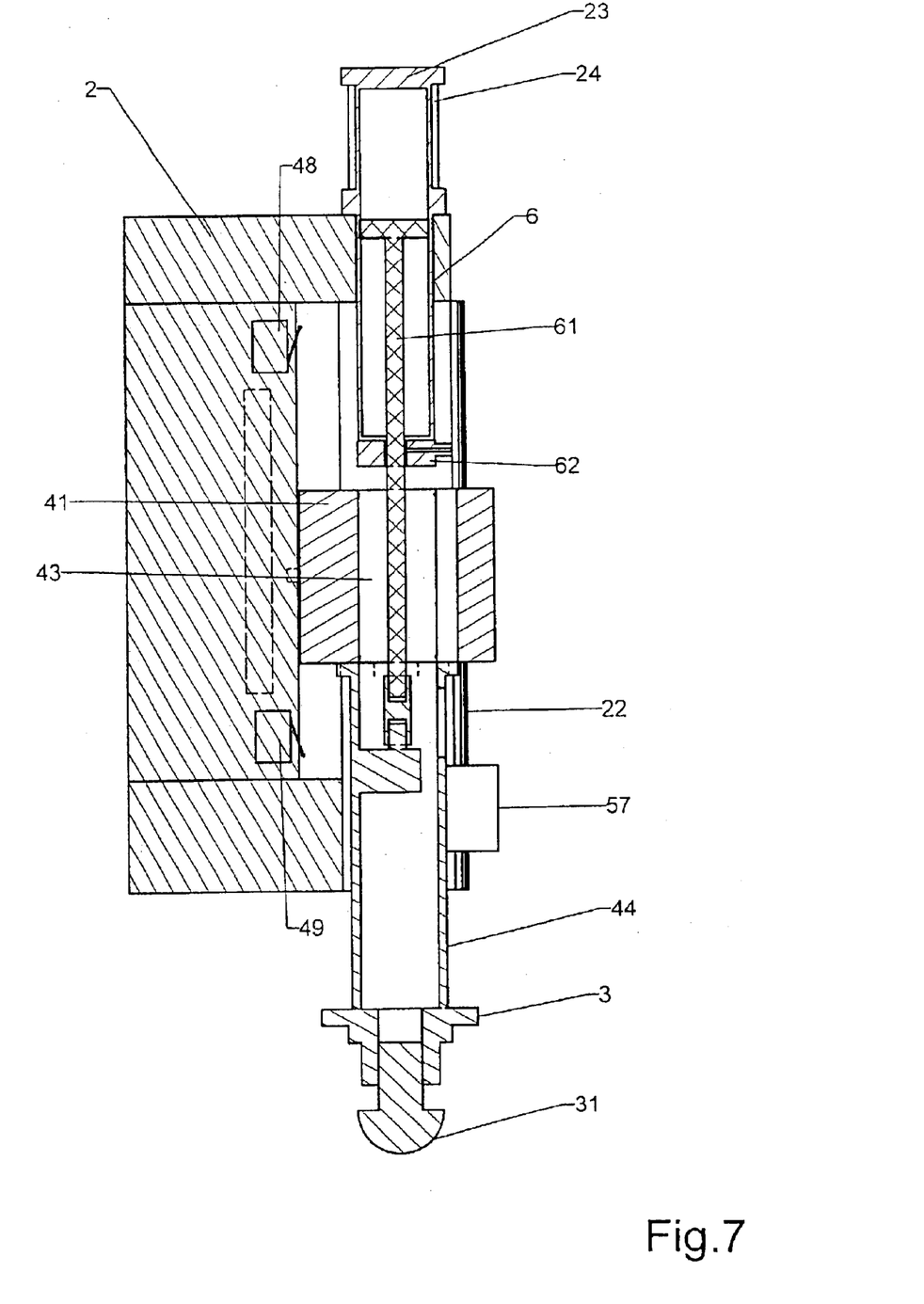
FIG. 7 is a left cross-sectional view of the first embodiment of an apparatus for electrodischarge machining in the present invention.
Figure 8:
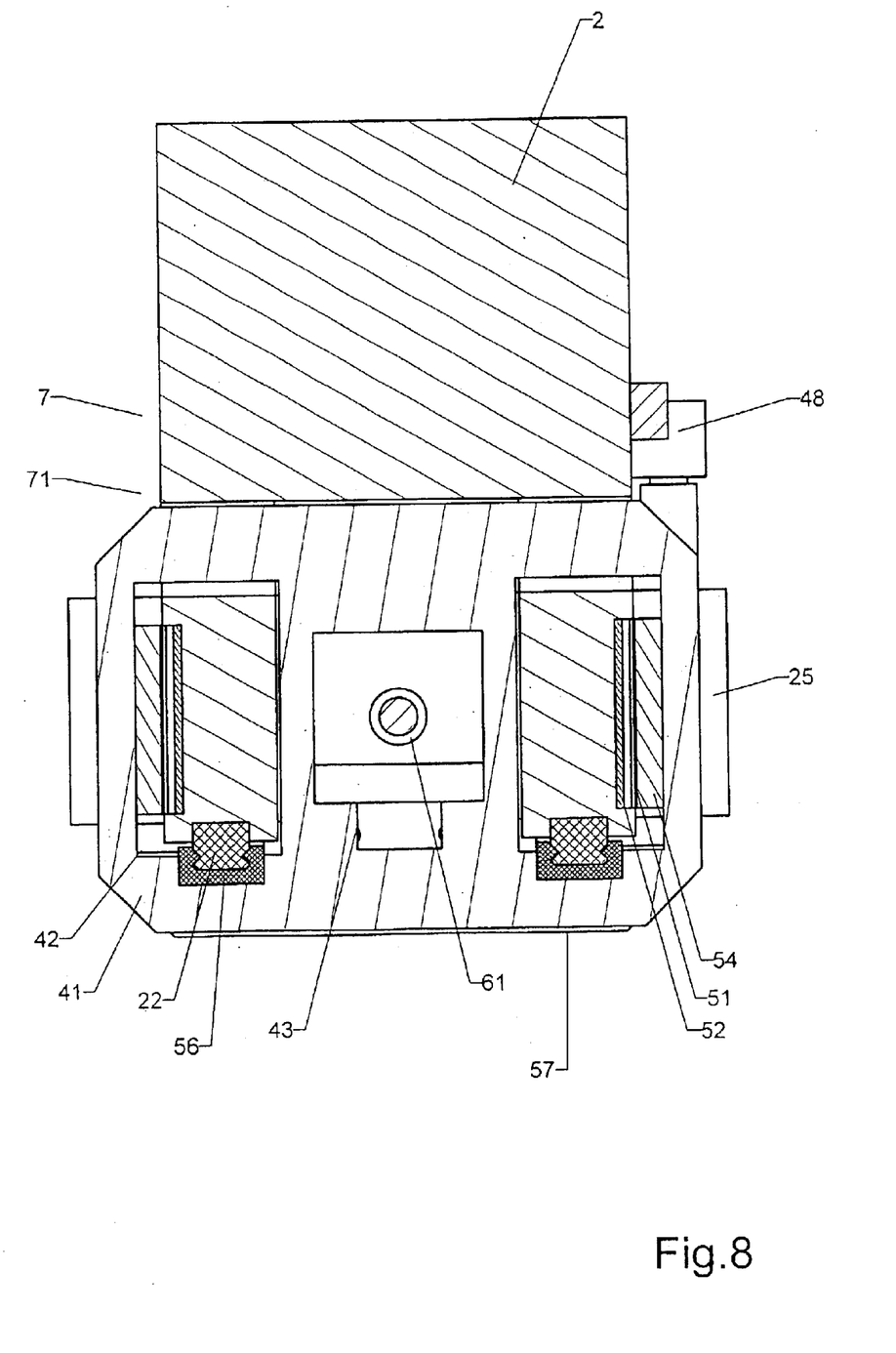
FIG. 8 is an upper cross-sectional view of the first embodiment of an apparatus for electrodischarge machining in the present invention.

Further, in order to reduce the load continually added on the linear motors 5, as shown in FIGS. 6, 7, 8 an air cylinder 6 is provided to support the weight so as to complete symmetrical force for controlling the motor driver. A comparatively slender piston rod 61 in the air cylinder 6 is used to take less space in the T-shaped quill 4 so as to reduce the dimensions of the quill 4. Then the projection edge 23 and the supporting frame 24 of the frame 2 are used to fix the rear end of the air cylinder 6, which is positioned in parallel to the moving axis, having the piston rod 61 extending down and passing through a brake 62 and having its outer end located in the square column 44 and connected firmly to a level fixing plate 45 positioned in the square column 44. The brake 62 clamps the piston rod 61 in the power-off time to prevent the tool electrode 31 from accidental falling. The other end of the piston rod 61 is located in the cylinder 6, reciprocating therein. A pressure gauge (not shown in the Figures) is provided to measure the inner pressure of the cylinder 6, with a pressure servo-controller controlling the inner pressure to let the inner pressure shore up the gravitational weight, reducing the electricity loading needed for the linear motors 5 during operation stopped.

Figure 9:
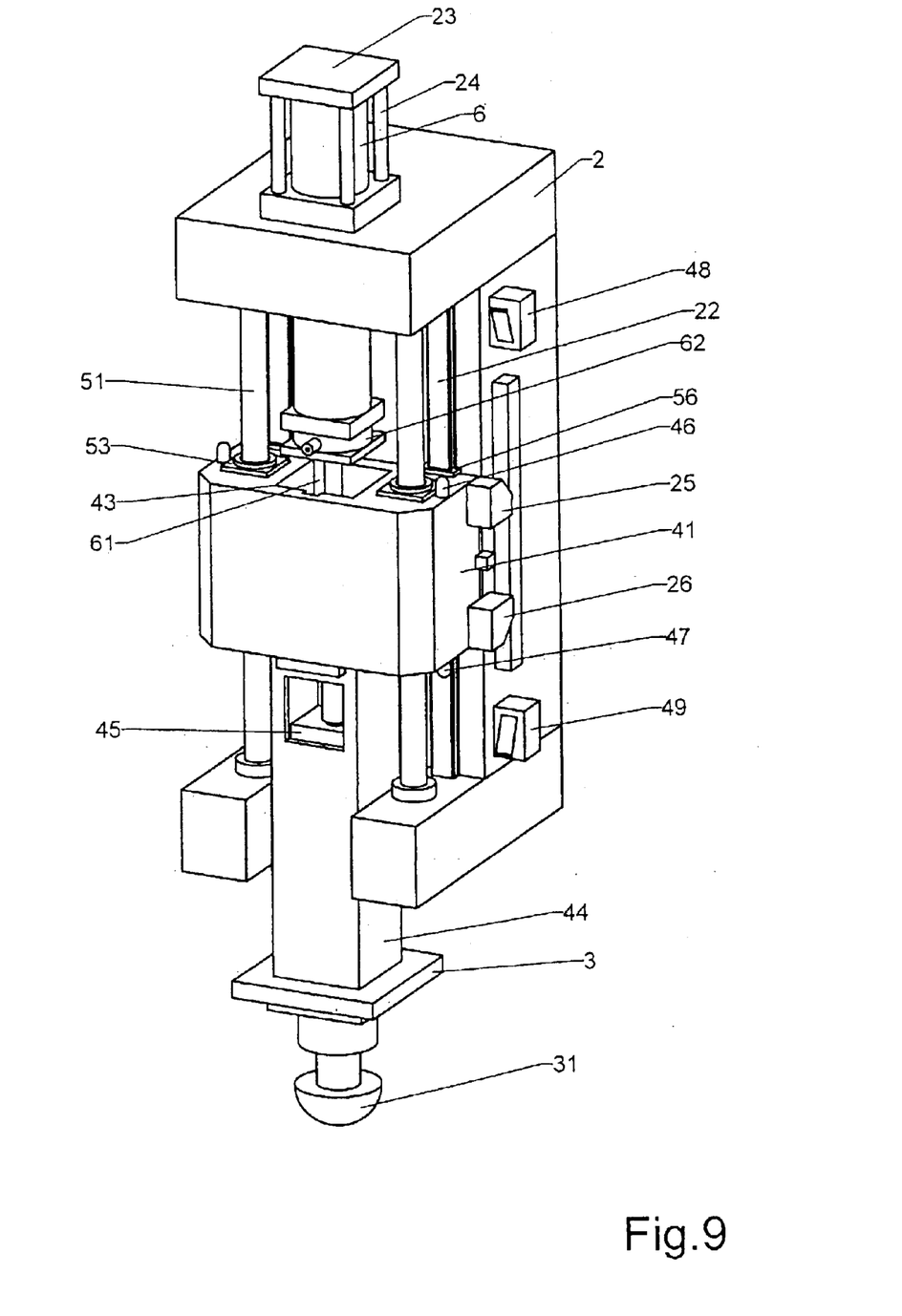
FIG. 9 is a perspective view of a second embodiment of an apparatus for electrodischarge machining in the present invention.
Figure 10:
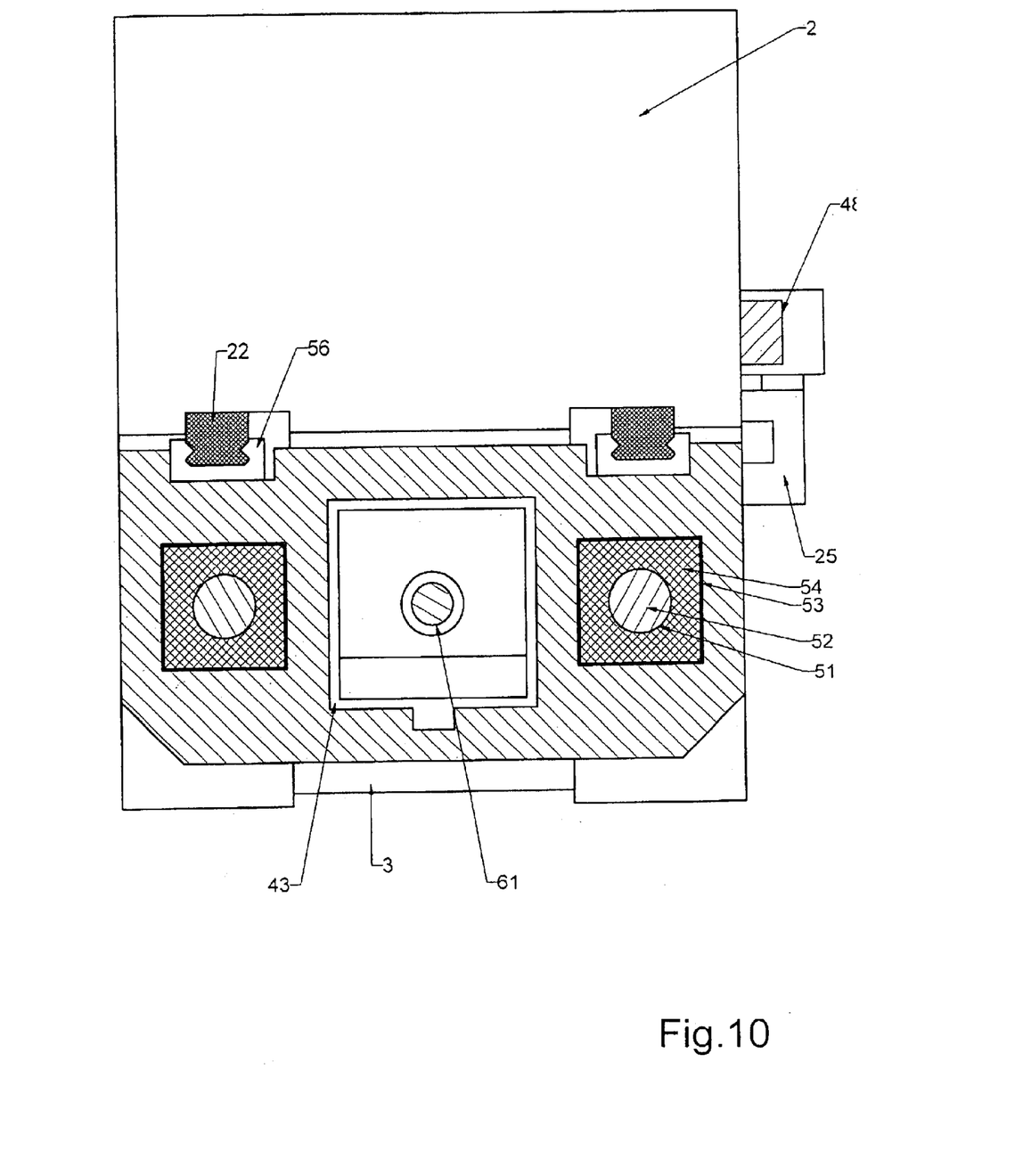
FIG. 10 is an upper cross-sectional view of the second embodiment of an apparatus for electrodischarge machining in the present invention.

Next, a second embodiment of an apparatus for electrodischarge machining is shown in FIGS. 9 and 10, having the same structure as the first embodiment except the linear motors 5, which have moving components of a yoke 53 and an armature coil 54 shaped as rectangular and contained in the two rectangular holes of the rectangular cubic member 41, and stationary components (or the stator) of a permanent magnet 51 and a magnet post 52. The yoke 53 has a center hole for the round permanent magnet 51 and the round magnet post 52 to fit therein, and the permanent magnet 51 and the magnet post 52 have their upper and their lower ends connected to the frame 2 in the same moving axis as the cubic member 41.

In the second embodiment, the stator of the linear motor 5 has its upper and its lower end directly connected to the frame 2 so that the T-shaped quill 4 may slide up and down smoothly, saving the two rectangular posts 21, the level fixing plate 57 and the lower bearing slide block 58 in the first embodiment.

Figure 11:
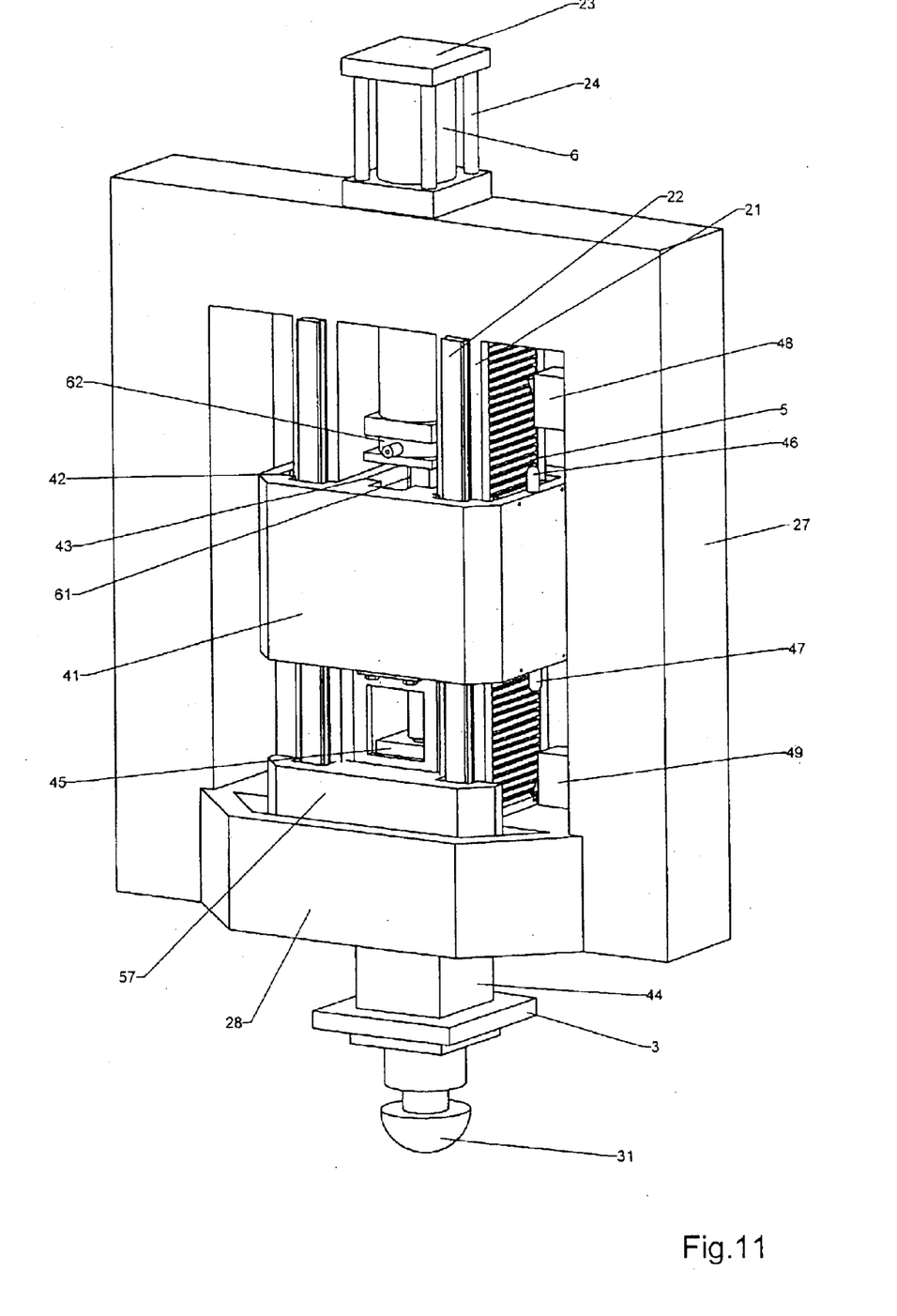
FIG. 11 is a perspective view of a third embodiment of an apparatus for electrodischarge machining in the present invention.
Figure 12:
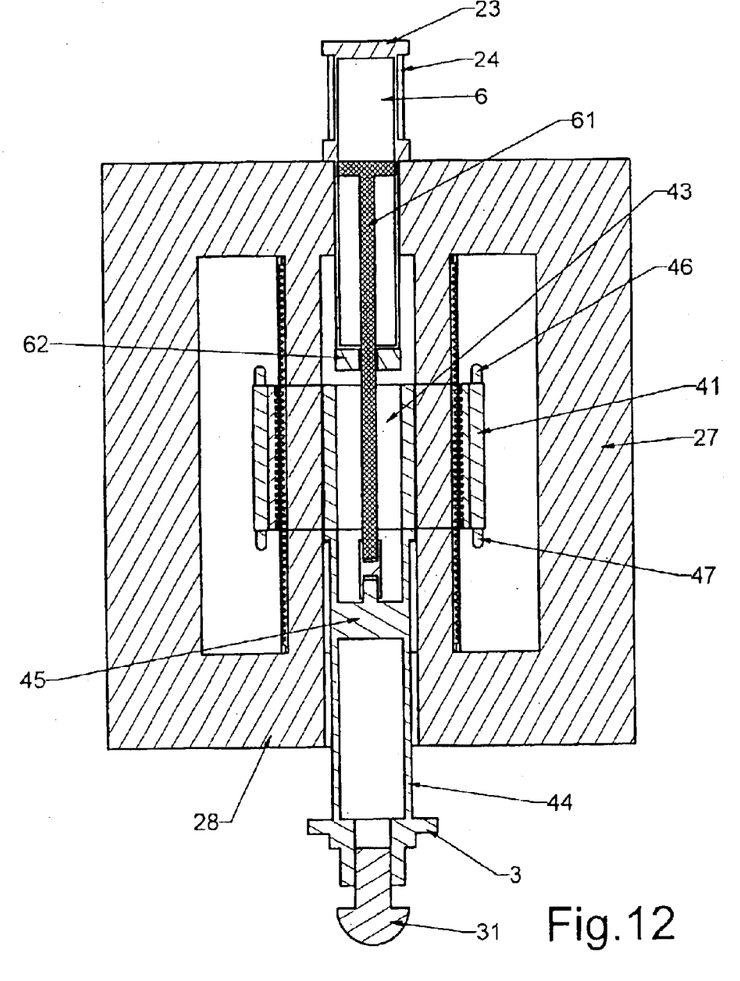
FIG. 12 is a front cross-sectional view of the third embodiment of an apparatus for electrodischarge machining in the present invention; and, FIG. 13 is an upper cross-sectional view of the third embodiment of an apparatus for electrodischarge machining in the present invention.
Figure 13:
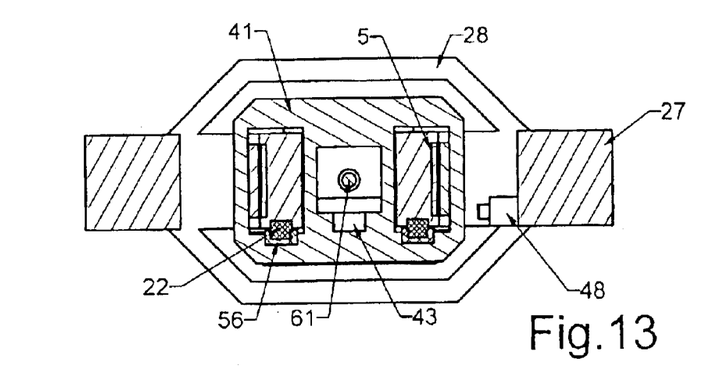

Next, a third embodiment of an apparatus for electrodedischarge machining is shown in FIGS. 11, 12 and 13, having the same structure as the first embodiment except the frame 2, which has a square block 27 with an inner square hole and two rectangular posts 21 positioned vertically in the inner square hole. The square block 27 further has a nearly θ-shaped member added to the lower end for reinforcing supporting force of the frame.

While the preferred embodiment of the invention have been described above, it will be recognized and understood that various modifications may be made therein and the appended claims are intended to cover all such modifications that may fall within the spirit and scope of the invention.

I claim:

1. An apparatus for electrodischarge machining for machining a workpiece by moving a tool electrode toward the workpiece in the vertical direction while causing electric discharge through an extremely small gap between the workpiece and the tool electrode, comprising:

a T-shaped quill moving in the vertical direction, having a rectangular cubic member formed in an upper portion and a square column formed in a lower portion, said cubic member having three coaxial through holes, two of said through holes located at two sides with one of them with a T-shaped cross-section located between said two through holes, said square column having its upper end fixed with a lower end of said cubic member, a level fixing plate provided in an intermediate point in said square column to define a hole in an upper portion of said straight cylinder, said upper hole having the same cross-section as that of the T-shaped hole of said cubic member and communicating with the same hole;

an electrode mounting device provided under said square column of said T-shaped quill in the same axis of said cubic member and said square column;

two rectangular posts fitting in said two rectangular through holes in the same axis direction as said T-shaped quill and having an upper and a lower end connected to said frame;

at least two linear motors respectively consisting of a moving member and a stator, said moving member positioned in said two through holes of said cube member in a symmetrical location with said T-shaped through hole as a center, said stators respectively positioned to face said moving members; and, a counter balance device for balancing gravitational force acting on said T-shaped quill and said electrode-mounting device.

2. The apparatus for electrodischarge machining as claimed in claim 1, wherein said moving members of said linear motors respectively have a yoke and an armature coil winding around said yoke, and said stators of said linear motors have a rectangular magnetic plate combined with said two posts and a plurality of permanent magnets spaced apart and fixed sidewise with said magnetic plate.

3. The apparatus for electrodischarge machining as claimed in claim 1, wherein said counter balance device has an air cylinder having the same axis with said T-shaped through hole of said cubic member, and said air cylinder has its bottom up and fixed by a support frame, having a piston rod extending down orderly through said T-shaped through hole and a center hole of said square column and connected with said level fixing plate in said square column.

4. The apparatus for electrodischarge machining as claimed in claim 1, wherein a linear roller bearing rail is further provided at the front side of said two posts, an upper bearing base is further provided on an inner front side of said two rectangular through holes of said cubic member, and said linear roller bearing rail is firmly connected with said upper bearing base.

5. The apparatus for electrodischarge machining as claimed in claim 1, wherein a fix plate is further provided on an outer side of an intermediate portion of said square column of said T-shaped quill, and two symmetrical lower bearing slide blocks are provided inside said fix plate, having the same axis as that of said T-shaped through hole.

6. An apparatus for electrodischarge machining for machining a workpiece by moving a tool electrode toward the workpiece in a vertical direction while causing electric discharge through an extremely small gap between the work piece and the tool electrode, comprising:

a T-shaped quill movable in the vertical direction, having a cubic member formed in an upper portion and a square column formed in a lower portion, said cubic member having three coaxial through holes, two of said through holes located at two sides and one of them located between said two through holes and having a T-shaped cross-section; said square column having its upper side firmly fixed with a lower side of said cubic member, a level fix plate fixed in an intermediate point in said square column to define an upper hole in an upper portion of said square column, said upper hole having the same shape as said T-shaped through hole and communicating with the same hole;

an electrode mounting device provided under said square column of said T-shaped quill in the same axis with said cube member and said square column;

at least two linear motors respectively having a moving member and a stator, said moving members being rectangular and positioned in said rectangular holes of said cubic member and having a center round hole for said stator to fit therein, said stator being round and having an upper and a lower end connected with a frame in the same sliding axis as that of said cubic member; and, a counter balance device for balancing gravitational force acting on said T-shaped quill and said electrode mounting device.

7. The apparatus for electrodischarge machining as claimed in claim 6, wherein said moving member of said linear motor consists of a yoke and an armature coil wound around said yoke, and said stator consists of a post-shaped magnet and a plurality of permanent magnet fixed sidewise with said post-shaped magnet.

* * * * *